United States Patent
Bennett et al.

(10) Patent No.: US 7,051,288 B2
(45) Date of Patent: May 23, 2006

(54) METHOD, SYSTEM, AND PRODUCT FOR A JAVA-BASED DESKTOP TO PROVIDE WINDOW MANAGER SERVICES ON UNIX

(75) Inventors: Scott James Bennett, Round Rock, TX (US); Joseph Herbert McIntyre, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 09/784,593

(22) Filed: Feb. 15, 2001

(65) Prior Publication Data

US 2002/0112090 A1    Aug. 15, 2002

(51) Int. Cl.
*G06F 3/00* (2006.01)
*G06F 9/00* (2006.01)
*G06F 17/00* (2006.01)

(52) U.S. Cl. ................ 715/781; 703/23; 717/148; 715/744; 715/764; 715/970; 715/733

(58) Field of Classification Search ........... 345/744, 345/764, 781, 970, 733; 703/23, 26, 27; 709/200; 717/118, 141, 148, 158, 176, 178
See application file for complete search history.

(56) References Cited

U.S. PATENT DOCUMENTS

| | | | |
|---|---|---|---|
| 5,179,700 A | 1/1993 | Aihara et al. ............... 345/744 |
| 5,408,602 A | 4/1995 | Giokas et al. ............... 345/733 |
| 5,831,609 A | 11/1998 | London et al. .............. 345/746 |
| 5,926,631 A * | 7/1999 | McGarvey ................... 703/23 |
| 5,928,324 A | 7/1999 | Sloan .......................... 709/203 |
| 5,974,256 A | 10/1999 | Matthews et al. ........... 717/141 |
| 5,982,371 A | 11/1999 | Burridge .................... 345/418 |
| 6,091,412 A | 7/2000 | Simonoff et al. .......... 345/749 |
| 6,289,506 B1 * | 9/2001 | Kwong et al. .............. 717/148 |

OTHER PUBLICATIONS

Dalheimer et al. ("Running Linux") Aug. 1999, (4 pages).*

(Continued)

*Primary Examiner*—Kristine Kincaid
*Assistant Examiner*—Boris Pesin
(74) *Attorney, Agent, or Firm*—Duke W. Yee; Marilyn Smith Dawkins; Wayne P. Bailey (57) ABSTRACT

A window manager proxy method, system, and product are described allowing a Java based desktop to provide window manager services on UNIX. A computer system executes a UNIX-based operating system and a desktop implemented in Java. The computer system does not include a separate window manager. Java applications are presented by the computer system utilizing a graphical user interface. Native UNIX applications are also presented by the computer system utilizing the same graphical user interface. Native UNIX applications interact with the window manager proxy in the same manner in which they would interact with a traditional window manager. The window manager proxy forwards frame window activity related to the desktop to the Java desktop, and is the native interface from the Java desktop to the native platform for frame window activities. Native UNIX applications, Java applications, and the Java desktop are thus rendered and managed in a consistent manner providing the end user with the look and feel as configured within the Java desktop.

30 Claims, 4 Drawing Sheets

OTHER PUBLICATIONS

Your First Cup of Java (for Unix) Mar. 9, 2000.*
MindTeam Terminal v1.1.5 Screen Shots 1999.*
Network Services Guide for UNIX users (Aug. 2000).*

Http://whatis.techtarget.com/WhatIs_Definition_Page/0,4152,213989,00.html, "Graphical User Interface", Feb. 5, 2001, pp. 1-2.

* cited by examiner

METHOD, SYSTEM, AND PRODUCT FOR A JAVA-BASED DESKTOP TO PROVIDE WINDOW MANAGER SERVICES ON UNIX

BACKGROUND OF THE INVENTION

1. Technical Field

The present invention relates generally to data processing systems. More particularly, the present invention relates to a method, system, and product for managing window services in order to present the same graphical user interface to native UNIX applications and Java applications in a computer system executing a UNIX-based operating system and a Java desktop.

2. Description of Related Art

Computer systems often utilize a graphical user interface to present information to users. The graphical user interface represents icons, window frames, menus, dialog boxes, and other items on a computer system's display screen. Users are more efficient when computer systems utilize a consistent graphical user interface (GUI) to present information.

In current embodiments, UNIX window managers provide both the look of the desktop, by rendering the desktop background, icons, and other desktop elements, and the feel of the desktop, i.e. its behavior. They also have responsibility for the rendering and user interaction with the frame windows attached to applications.

A problem arises, however, when creating a new desktop that is written in Java which desires to manage the look and feel of the desktop. The Java Virtual Machine and its libraries are not designed to fulfill the responsibilities that a window manager has to native UNIX applications. For example, without a window manager to provide frame window support, native applications will not have frame windows.

Figures 1, 2:
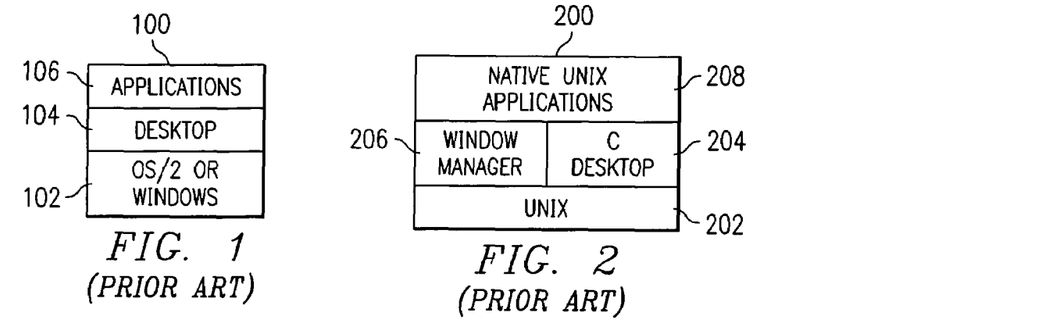
FIG. 1 depicts a computer system executing either an OS/2 or a Windows operating system, a desktop, and applications in accordance with the prior art.
FIG. 2 illustrates a computer system executing a UNIX-based operating system, a desktop implemented in the C language, a window manager, and UNIX applications written for a UNIX-based operating system in accordance with the prior art.

FIG. 1 depicts a computer system 100 executing either an OS/2 or a Windows operating system 102, a desktop 104, and applications 106 in accordance with the prior art. OS/2 is a trademark of International Business Machines. Windows is a trademark of Microsoft Corporation. Applications executing on these platforms manage their own frame windows, obviating the necessity of the Java desktop to provide these capabilities in system 100.

FIG. 2 illustrates a computer system 200 executing a UNIX-based operating system 202, a desktop 204 implemented in the C language, a window manager 206, and UNIX applications 208 written for a UNIX-based operating system in accordance with the prior art. Window manager 206 provides a frame window and handles the interaction between the frame windows and the desktop for applications 208. Unix-based operating system may include any UNIX operating system, such as AIX.

Figure 3:
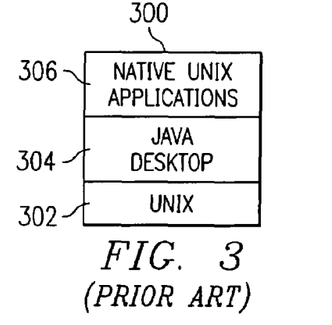
FIG. 3 depicts a computer system executing a UNIX-based operating system and having a Java desktop in accordance with the prior art.

FIG. 3 depicts a computer system 300 executing a UNIX-based operating system 302 and having a Java desktop 304 in accordance with the prior art. Java, originally developed by Sun Microsystems, is an object-oriented, multi-threaded, portable, platform-independent, secure programming environment used to develop, test, and maintain software programs. Java programs have found extensive use on the Internet. These programs include full-featured interactive, standalone applications, as well as smaller programs, known as applets, that run in a Java-enabled Web browser or applet viewer.

A window manager, however, is not provided in computer system 300. When native UNIX applications are executed on computer system 300, the application client area will be displayed, but no frame window will enclose the client application area. This behavior would be considered faulty by an end user of this system.

Computer system 300 could have an existing window manager added that would provide the frame window rendering and interaction, but this would introduce two desktop features into the system, i.e. the native window manager and Java desktop, and these two desktop features could present conflicting GUI characteristics to the end user.

The rendering of native UNIX applications in a graphical environment is based on a client/server window system known as X Windows, initially developed at the Massachusetts Institute of Technology. X Windows provides a protocol for the client and server portions of an application to communicate with each other for display and input. An X Windows application consists of an application client area that is rendered by the application, and a frame window that is rendered and managed by the window manager. Events related to the application client window are handled by the application. Events related to the frame window are handled by the window manager.

Therefore, a need exists for the function of the window manager to be distributed between a Java desktop manager and a window manager proxy focused on the management of message passing between applications requiring window manager services and the Java desktop manager in a computer system executing a UNIX-based operating system with a Java desktop, but having no full featured window manager.

SUMMARY OF THE INVENTION

A window manager proxy method, system, and product are described allowing a Java based desktop to provide window manager services on UNIX. A computer system executes a UNIX-based operating system and a desktop implemented in Java. The computer system does not include a separate window manager. Java applications are presented by the computer system utilizing a graphical user interface. Native UNIX applications are also presented by the computer system utilizing the same graphical user interface. Native UNIX applications interact with the window manager proxy in the same manner in which they would interact with a traditional window manager. The window manager proxy forwards frame window activity related to the desktop to the Java desktop, and is the native interface from the Java desktop to the native platform for frame window activities. Native UNIX applications, Java applications, and the Java desktop are thus rendered and managed in a consistent manner providing the end user with the look and feel as configured within the Java desktop.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The invention is preferably realized using a well-known computing platform, such as an IBM RS/6000 workstation running the IBM AIX operating system. However, it may be realized in other popular computer system platforms, such as an IBM personal computer running the Microsoft Windows operating system or a Sun Microsystems workstation running operating systems such as UNIX or LINUX, without departing from the spirit and scope of the invention.

The present invention is a window manager proxy and a Java desktop capable of rendering and managing frame windows for X Windows applications. The window manager proxy and Java desktop execute within a computer system which is executing a UNIX-based operating system. The computer system does not include a separate window manager.

Native UNIX X Windows applications consist of an application client window rendered by the application and a frame window surrounding the application client window rendered by a window manager. In this invention, the function of the window manager is distributed between the window manger proxy and the Java desktop. The Java desktop is responsible for rendering the frame window and managing frame window events. The window manger proxy is the communication channel through which the application and Java desktop communicate. Native application client window events are executed in their native form, unaltered.

Whether an application is a Java application or a native UNIX application, the Java desktop provides the frame window, and supports a particular graphical user interface. When a native UNIX application generates native events, the window manger proxy forwards these events to be handled by the Java desktop. In this manner, native UNIX applications and Java applications are presented utilizing the same graphical user interface. Both application types are presented with the same look and feel.

Figure 4:
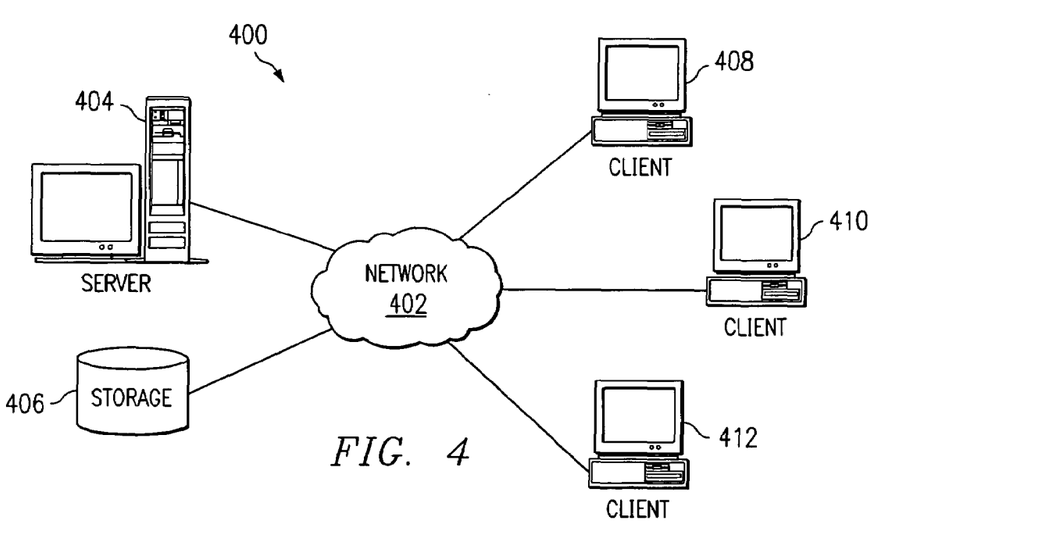
FIG. 4 depicts a pictorial representation of a networked data processing system in which the present invention may be implemented.

With reference now to the figures, and in particular with reference to FIG. 4, a pictorial representation of a networked data processing system is depicted in which the present invention may be implemented. Networked data processing system 400 is a network of computers in which the present invention may be implemented. Networked data processing system 400 contains network 402, which is the medium used to provide communications links between various devices and computers connected within networked data processing system 400. Network 402 may include permanent connections, such as wire or fiber optic cables, or temporary connections made through telephone connections.

In the depicted example, server 404 is connected to network 402, along with storage unit 406. In addition, clients 408, 410, and 412 are also connected to network 402. These clients, 408, 410, and 412, may be, for example, personal computers, network computers, personal digital assistants, data network compatible cellular devices, cable or satellite TV set-top boxes, Internet ready game consoles, and the like. For purposes of this application, a network computer is any computer coupled to a network which receives a program or other application from another computer coupled to the network. In the depicted example, server 404 provides data, such as boot files, operating system images and applications, to clients 408–412. Clients 408, 410, and 412 are clients to server 404. Networked data processing system 400 may include additional servers, clients, and other devices not shown.

Networked data processing system 400 may be the Internet, with network 402 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, networked data processing system 400 also may be implemented as a number of different types of networks such as, for example, an intranet or a local area network. FIG. 4 is intended as an example and not as an architectural limitation for the processes of the present invention.

Figure 5:
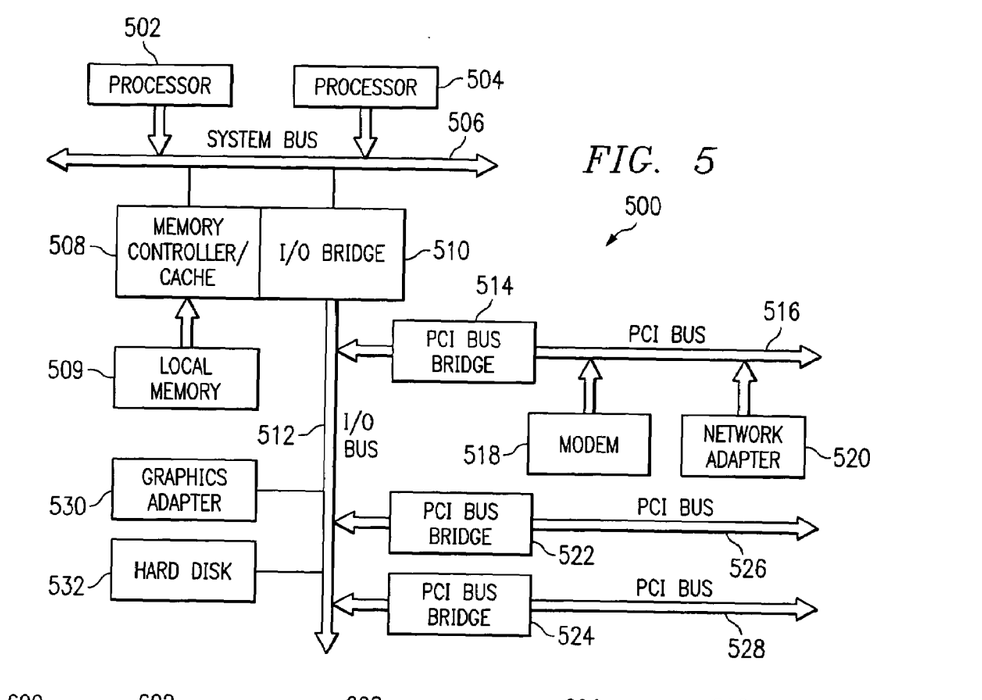
FIG. 5 illustrates a block diagram of a data processing system which may be implemented as a server in accordance with the present invention.

FIG. 5 illustrates a block diagram of a data processing system which may be implemented as a server, such as server 404 in FIG. 4, in accordance with the present invention. Data processing system 500 may be a symmetric multiprocessor (SMP) system including a plurality of processors 502 and 504 connected to system bus 506. Alternatively, a single processor system may be employed. Also connected to system bus 506 is memory controller/cache 508, which provides an interface to local memory 509. I/O bus bridge 210 is connected to system bus 506 and provides an interface to I/O bus 512. Memory controller/cache 508 and I/O bus bridge 510 may be integrated as depicted. Peripheral component interconnect (PCI) bus bridge 514 connected to I/O bus 512 provides an interface to PCI local bus 516. A number of modems 518–520 may be connected to PCI bus 516. Typical PCI bus implementations will support four PCI expansion slots or add-in connectors. Communications links to network computers 408–412 in FIG. 4 may be provided through modem 518 and network adapter 520 connected to PCI local bus 516 through add-in boards. Additional PCI bus bridges 522 and 524 provide interfaces for additional PCI buses 526 and 528, from which additional modems or network adapters may be supported. In this manner, server 500 allows connections to multiple network computers. A memory mapped graphics adapter 530 and hard disk 532 may also be connected to I/O bus 512 as depicted, either directly or indirectly.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention. The data processing system depicted in FIG. 5 may be, for example, an IBM RISC/System 6000, a product of International Business Machines Corporation in Armonk, N.Y., running the Advanced Interactive Executive (AIX) operating system.

Figure 6:
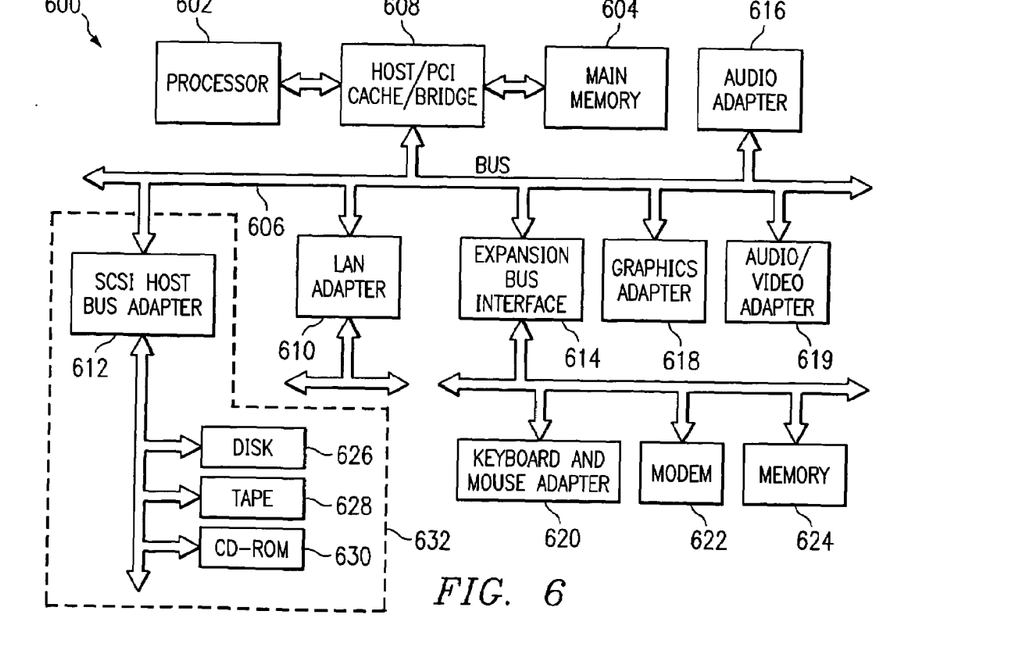
FIG. 6 illustrates a block diagram of a data processing system which may be implemented as a client in accordance with the present invention.

FIG. 6 illustrates a block diagram of a data processing system in which the present invention may be implemented. Data processing system 600 is an example of a client computer. Data processing system 600 employs a peripheral component interconnect (PCI) local bus architecture. Although the depicted example employs a PCI bus, other bus architectures, such as Micro Channel or ISA, may be used.

Processor 602 and main memory 604 are connected to PCI local bus 606 through PCI bridge 608. PCI bridge 608 may also include an integrated memory controller and cache memory for processor 602. Additional connections to PCI local bus 606 may be made through direct component interconnection or through add-in boards. In the depicted example, local area network (LAN) adapter 610, SCSI host bus adapter 612, and expansion bus interface 614 are connected to PCI local bus 606 by direct component connection. In contrast, audio adapter 616, graphics adapter 618, and audio/video adapter (A/V) 619 are connected to PCI local bus 606 by add-in boards inserted into expansion slots. Expansion bus interface 614 provides a connection for a keyboard and mouse adapter 620, modem 622, and additional memory 624.

In the depicted example, SCSI host bus adapter 612 provides a connection for hard disk drive 626, tape drive 628, CD-ROM drive 630, and digital video disc read only memory drive (DVD-ROM) 632. Typical PCI local bus implementations will support three or four PCI expansion slots or add-in connectors.

An operating system runs on processor 602 and is used to coordinate and provide control of various components within data processing system 600 in FIG. 6. The operating system may be a commercially available operating system, such as Windows 2000, which is available from Microsoft Corporation. Windows is a trademark of Microsoft Corporation. In a preferred embodiment, the operating system is a UNIX-type operating system.

An object oriented programming system, such as Java, may run in conjunction with the operating system, providing calls to the operating system from Java programs or applications executing on data processing system 600. Instructions for the operating system, the object-oriented operating system, and applications or programs are located on a storage device, such as hard disk drive 626, and may be loaded into main memory 604 for execution by processor 602.

Those of ordinary skill in the art will appreciate that the hardware in FIG. 6 may vary depending on the implementation. For example, other peripheral devices, such as optical disk drives and the like, may be used in addition to or in place of the hardware depicted in FIG. 6. The depicted example is not meant to imply architectural limitations with respect to the present invention. For example, the processes of the present invention may be applied to multiprocessor data processing systems.

Figure 7:
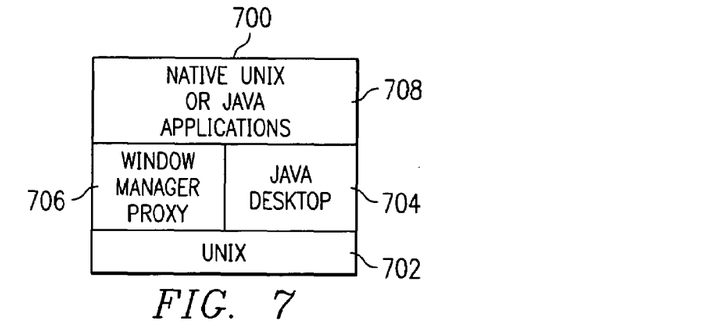
FIG. 7 depicts a computer system executing a UNIX-based operating system, a Java desktop, a window manager proxy, and native UNIX applications in accordance with the present invention.

FIG. 7 depicts a computer system 700 executing a UNIX-based operating system 702, a Java desktop 704, a window manager proxy 706, and applications 708 which may be native UNIX applications or Java applications in accordance with the present invention. When the application being executed is a Java application, the Java desktop provides the window frame processing to provide a particular graphical user interface. When the application being executed is a native UNIX application, the Java desktop provides the frame window processing, and works cooperatively with window manager proxy 706 to interact with the native UNIX application to provide the same graphical user interface. The Java desktop and window manager proxy communicate through a Java Native Interface (JNI) since the window manger proxy is implemented as native UNIX code using the C language. Those of ordinary skill in the art will recognize that the window manager proxy may be implemented in other native languages such as C++.

Figure 8:
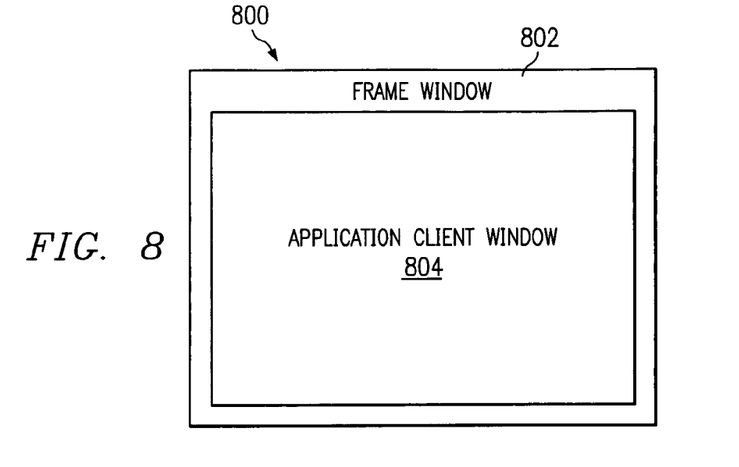
FIG. 8 illustrates a graphical window which may be displayed on a display screen to a user in accordance with the present invention.

FIG. 8 illustrates a graphical window 800 which may be displayed on a display screen to a user in accordance with the present invention. Graphical window 800 includes a frame window 802 and an application client window portion 804. Frame window 802 is rendered and managed by the present invention by Java desktop 704 in conjunction with window manager proxy 706. Application client window portion 804 is rendered and managed by application 708. Window manager proxy 706 does not render frame 802 or manage frame events, such as events to move or resize frame 802. Window manager proxy 706 may be called programmatically by applications to change the position or size of the frame window, and in these cases it will forward these events to Java desktop 704 for processing. Applications display with their frames being rendered by the Java desktop, and their client windows being rendered by the application.

Figure 9:
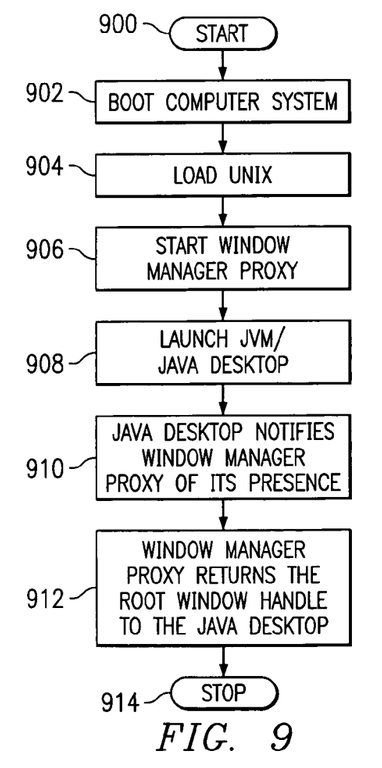
FIG. 9 is a high level flow chart which illustrates the startup process for the Java desktop with the window manager proxy in accordance with the present invention.

FIG. 9 is a high level flow chart which illustrates the setup and starting of a computer system which includes a Java desktop and window manager proxy in accordance with the present invention. The process starts as depicted by block 900 and thereafter passes to block 902 which depicts booting the computer system. Next, block 904 illustrates loading a UNIX-type operating system. Thereafter, block 906 depicts starting the window manager proxy. Block 908, then, illustrates launching a Java Virtual Machine (JVM) JVM/Java desktop. The process then passes to block 910 which depicts the Java desktop notifying the window manager proxy of the Java desktop's presence in the system. Next, block 912 illustrates the Java desktop receiving the root window handle from the window manager proxy. The process then terminates as depicted by block 914.

Figure 10:
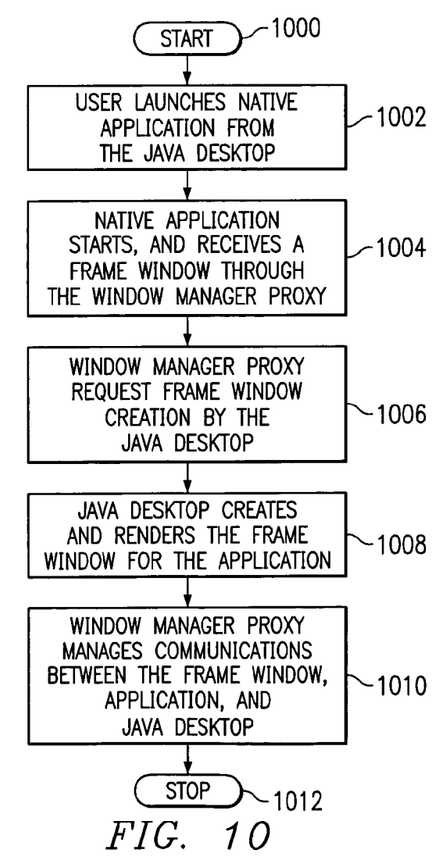
FIG. 10 is a high level flow chart which depicts a process followed when a native application is launched in accordance with the present invention.

FIG. 10 is a high level flow chart which depicts a process which is followed when a native UNIX application is launched from the Java desktop in accordance with the present invention. The process starts as depicted by block 1000 and thereafter passes to block 1002 which illustrates the action initiated by the user of the Java desktop to launch a native application. This action may be through the use of an icon, menu item, or other user interface feature. In response to this action, the native application will start and, in accordance with the normal startup procedure for an X Windows application, will communicate with the window manager proxy to get a frame window, as depicted by block 1004. The process then passes to block 1006 which illustrates the window manager proxy communicating with the Java desktop to create the frame window. The process then passes to block 1008 which depicts the Java desktop creating and rendering the frame window for the application. Thereafter, block 1010 illustrates the window manager proxy managing communications between the frame window, application, and the Java desktop. The operation depicted by block 1010 is the continuous operation of the cooperating elements, the application, window manager proxy, and Java desktop, that interact to manage the frame window and application client window. The process then terminates as depicted by block 1012.

Figure 11:
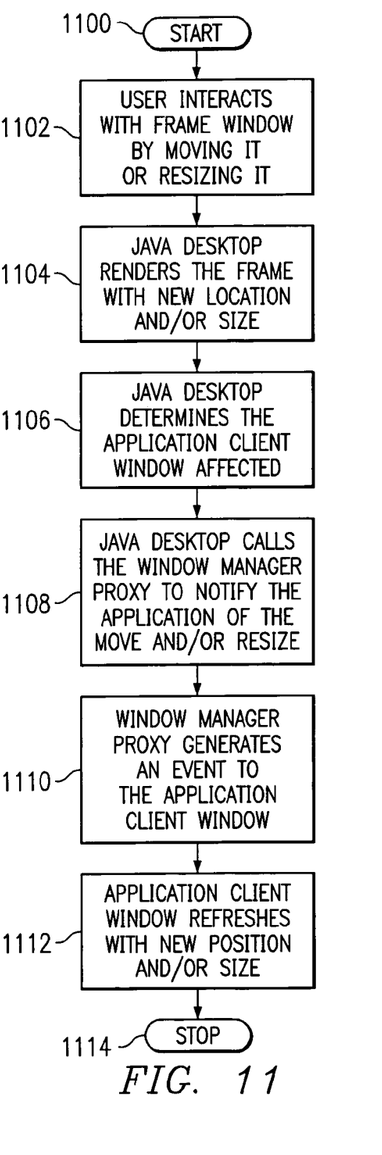
FIG. 11 is a high level flow chart which illustrates the execution flow of a Java desktop managing user interactions with a frame window in accordance with the present invention.

FIG. 11 is a high level flow chart which illustrates the interaction between the Java desktop, window manager proxy, and application during user interactions with the frame window in accordance with the present invention. The process starts as depicted by block 1100 and thereafter passes to block 1102 which depicts a user interacting with a frame window by moving or resizing the frame window. Next, block 1104 illustrates the Java desktop rendering the frame at the new location and/or with the new size. Thereafter, block 1106 depicts the Java desktop determining which application client window was affected by the change to the frame window. The process then passes to block 1108 which illustrates the Java desktop calling the window manager proxy to notify the application of the move and/or resize of its client window. Next, block 1110 depicts the window manager proxy generating an event to the application client window. Thereafter, block 1112 illustrates the application client window refreshing itself with the new position and/or size. The process then terminates as depicted by block 1114.

Figure 12:
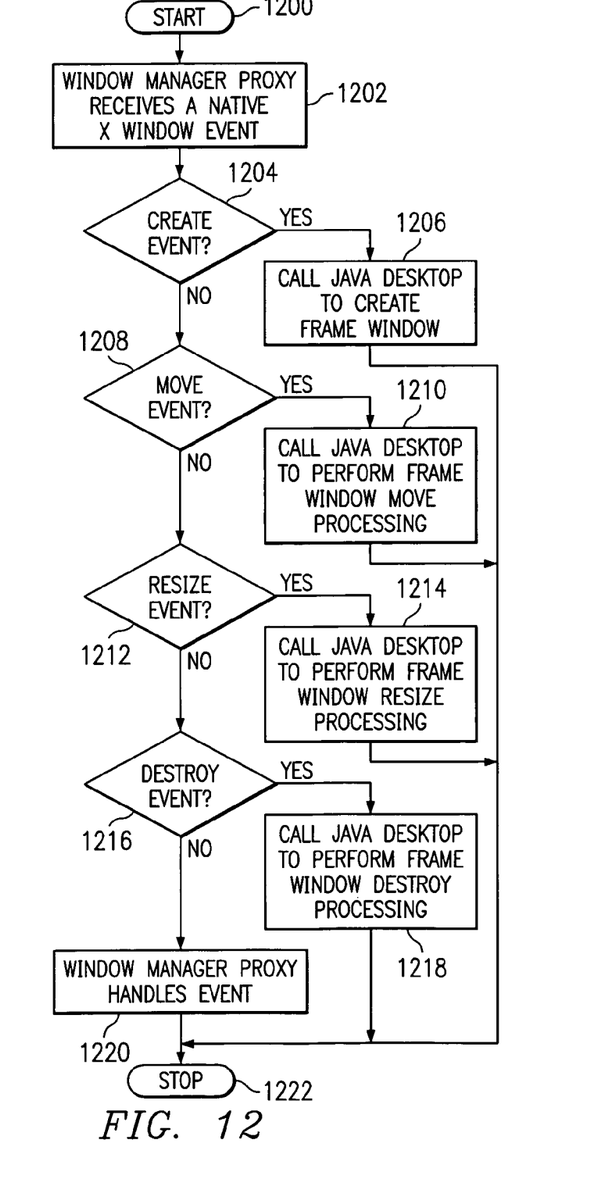
FIG. 12 is a high level flow chart which depicts the execution flow for actions initiated programmatically through the window manger proxy from a native UNIX application, including events forwarded to the Java desktop, in accordance with the present invention.

FIG. 12 is a high level flow chart which depicts the execution flow for actions initiated programmatically through the window manger proxy from a native UNIX application, including events forwarded to the Java desktop, in accordance with the present invention. The process starts as depicted by block 1200 and thereafter passes to block 1202 which illustrates the window manager proxy receiving a native X Windows event. The event type will determine the course of action to follow. Thereafter, block 1204 depicts a determination of whether or not the event is a create event. If a determination is made that the event is a create event, the process passes to block 1206 which illustrates the window manager proxy calling the Java desktop to create a frame window. The process then terminates as depicted by block 1222.

Referring again to block 1204, if a determination is made that the event is not a create event, the process passes to block 1208 which illustrates a determination of whether or not the event is a move event. If a determination is made that the event is a move event, the process passes to block 1210 which illustrates the window manager proxy calling the Java desktop to perform frame window move processing. The process then terminates as depicted by block 1222.

Referring again to block 1208, if a determination is made that the event is not a move event, the process passes to block 1212 which illustrates a determination of whether or not the event is a resize event. If a determination is made that the event is a resize event, the process passes to block 1214 which illustrates the window manager proxy calling the Java desktop to perform frame window resize processing. The process then terminates as depicted by block 1222.

Referring again to block 1212, if a determination is made that the event is not a resize event, the process passes to block 1216 which illustrates a determination of whether or not the event is a destroy event. If a determination is made that the event is a destroy event, the process passes to block 1218 which illustrates the window manager proxy calling the Java desktop to perform frame window destroy processing. The process then terminates as depicted by block 1222.

Referring again to block 1216, if a determination is made that the event is not a destroy event, the process passes to block 1220 which illustrates the window manager proxy handling the event. The process then terminates as depicted by block 1220.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer system, said method comprising the steps of:
   executing a UNIX-based operating system within said computer system;
   executing a Java desktop within said UNIX-based operating system;
   executing a window manager proxy within said UNIX-based operating system;
   graphically presenting native Java applications within said computer system utilizing a graphical user interface; and
   graphically presenting native UNIX applications within said computer system utilizing said graphical user interface, wherein Java applications and UNIX applications are presented by said computer system utilizing the same graphical user interface, wherein the window manager proxy is a communication channel between the native UNIX applications and the Java desktop.

2. The method according to claim 1, further comprising the step of distributing window manager functions between said Java desktop and said window manager proxy.

3. The method according to claim 2, wherein said step of distributing window manager functions to said Java desktop further comprises the steps of:
creating frame windows for Java applications and native UNIX applications utilizing said Java desktop;
managing user interactions with said frame windows utilizing said Java desktop; and
utilizing, by said Java desktop, said window manager proxy to communicate with said native UNIX applications.

4. The method according to claim 3, further comprising the step of resizing, utilizing said Java desktop, frame windows for said native UNIX applications.

5. The method according to claim 3, further comprising the step of moving, utilizing said Java desktop, frame windows for said native UNIX applications.

6. The method according to claim 2, wherein the step of distributing window manager functions to said window manager proxy further comprises the steps of:
establishing a communication interface support within said window manager proxy for permitting applications to connect to and interact with said window manager proxy;
routing a first plurality of events, utilizing said window manager proxy, to said Java desktop for processing; and
processing, by said window manager proxy, a second plurality of events.

7. The method according to claim 6, wherein said step of routing a first plurality of events further comprises the steps of:
translating said first plurality of events from a first language to a second language utilizing a translator; and
forwarding said translated first plurality of events to said Java desktop.

8. The method according to claim 6, wherein said step of translating said first plurality of events utilizing a translator further comprises the step of translating said first plurality of events utilizing a Java Native Interface.

9. The method according to claim 7, further comprising the steps of:
translating said first plurality of events from a C language to a Java language; and
forwarding said translated first plurality of events to said Java desktop.

10. The method according to claim 1, further comprising the steps of:
intercepting from one of said native UNIX applications, utilizing said window manager proxy, a frame window event to render a new window;
forwarding, utilizing said window manager proxy, said frame window event to a Java Native Interface;
translating said frame window event from a C language to a Java language utilizing said Java Native Interface;
transmitting said translated frame window event to said Java desktop; and
executing said translated frame window event utilizing said Java desktop, wherein said Java desktop renders said new window.

11. A computer system comprising:
a UNIX-based operating system being executed by said computer system;
a Java desktop being executed by said UNIX-based operating system;
a window manager proxy being executed by said UNIX-based operating system;
said window manager proxy for graphically presenting native Java applications within said computer system utilizing a graphical user interface; and
said window manager proxy for graphically presenting native UNIX applications within said computer system utilizing said graphical user interface, wherein Java applications and UNIX applications are presented by said computer system utilizing the same graphical user interface, wherein the window manager proxy is a communication channel between the native UNIX applications and the Java desktop.

12. The system according to claim 11, further comprising said Java desktop and said window manager proxy for processing window manager functions.

13. The system according to claim 12, further comprising:
said Java desktop for creating frame windows for Java applications and native UNIX applications;
said Java desktop for managing user interactions with said frame windows; and
said Java desktop for utilizing said window manager proxy to communicate with said native UNIX applications.

14. The system according to claim 13, further comprising said Java desktop for resizing frame windows for said native UNIX applications.

15. The system according to claim 13, further comprising said Java desktop for moving frame windows for said native UNIX applications.

16. The system according to claim 12, further comprising:
said window manager proxy for establishing a communication interface support within said window manager proxy for permitting applications to connect to and interact with said window manager proxy;
said window manager proxy for routing a first plurality of events to said Java desktop for processing; and
said window manager proxy for processing a second plurality of events.

17. The system according to claim 16, further comprising:
a translator for translating said first plurality of events from a first language to a second language; and
said translator for forwarding said translated first plurality of events to said Java desktop.

18. The system according to claim 16, further comprising a Java Native Interface for translating said first plurality of events.

19. The system according to claim 17, further comprising:
a translator for translating said first plurality of events from a C language to a Java language; and
said translator for forwarding said translated first plurality of events to said Java desktop.

20. The system according to claim 11, further comprising:
said window manager proxy for intercepting from one of said native UNIX applications a frame window event to render a new window;
said window manager proxy for forwarding said frame window event to a Java Native Interface;
said Java Native Interface for translating said frame window event from a C language to a Java language utilizing;
said Java Native Interface for transmitting said translated frame window event to said Java desktop; and
said Java desktop for executing said translated frame window event, wherein said Java desktop renders said new window.

21. A computer program product in a computer system, said computer program product comprising:

instruction means for executing a UNIX-based operating system within said computer system;

instruction means for executing a Java desktop within said UNIX-based operating system;

instruction means for executing a window manager proxy within said UNIX-based operating system;

instruction means for graphically presenting native Java applications within said computer system utilizing a graphical user interface; and instruction means for graphically presenting native UNIX applications within said computer system utilizing said graphical user interface, wherein Java applications and UNIX applications are presented by said computer system utilizing the same graphical user interface, wherein the window manager proxy is a communication channel between the native UNIX applications and the Java desktop.

22. The product according to claim 21, further comprising instruction means for distributing window manager functions between said Java desktop and said window manager proxy.

23. The product according to claim 22, wherein said instruction means for distributing window manager functions to said Java desktop further comprises:

instruction means for creating frame windows for Java applications and native UNIX applications utilizing said lava desktop;

instruction means for managing user interactions with said frame windows utilizing said Java desktop; and instruction means for utilizing, by said lava desktop, said window manager proxy to communicate with said native UNIX applications.

24. The product according to claim 23, further comprising instruction means for resizing utilizing said Java desktop, frame windows for said native UNIX applications.

25. The product according to claim 23, further comprising instruction means for moving, utilizing said lava desktop, frame windows for said native UNIX applications.

26. The product according to claim 22, wherein said instruction means for distributing window manager functions to said window manager proxy further comprises:

instruction means for establishing a communication interface support within said window manager proxy for permitting applications to connect to and interact with said window manager proxy;

instruction means for routing a first plurality of events, utilizing said window manager proxy, to said Java desktop for processing; and instruction means for processing, by said window manager proxy, a second plurality of events.

27. The product according to claim 26, wherein said instruction means for routing a first plurality of events further comprises:

instruction means for translating said first plurality of events from a first language to a second language utilizing a translator; and instruction means for forwarding said translated first plurality of events to said Java desktop.

28. The product according to claim 26, wherein said instruction means for translating said first plurality of events utilizing a translator further comprises instruction means for translating said first plurality of events utilizing a Java Native Interface.

29. The product according to claim 27, further comprising:

instruction means for translating said first plurality of events from a C language to a Java language; and instruction means for forwarding said translated first plurality of events to said Java desktop.

30. The product according to claim 21, further comprising:

instruction means for intercepting from one of said native UNIX applications, utilizing said window manager proxy, a frame window event to render a new window;

instruction means for forwarding, utilizing said window manager proxy, said frame window event to a Java Native Interface;

instruction means for translating said frame window event from a C language to a Java language utilizing said Java Native Interface;

instruction means for transmitting said translated frame window event to said Java desktop; and instruction means for executing said translated frame window event utilizing said Java desktop, wherein said Java desktop renders said new window.

* * * * *